United States Patent [19]

Cyphers

[11] Patent Number: 5,769,321

[45] Date of Patent: Jun. 23, 1998

[54] YOKE SUPPORT FOR PISTON PAINT PUMPS

[75] Inventor: Norman A. Cyphers, Rogers, Minn.

[73] Assignee: Wagner Spray Tech Corporation, Minneapolis, Minn.

[21] Appl. No.: 594,024

[22] Filed: Feb. 20, 1996

[51] Int. Cl.$^6$ .............................. A62C 15/00; B05B 9/08
[52] U.S. Cl. ......................... 239/154; 239/333; 239/332; 417/44
[58] Field of Search .................................. 239/332, 329, 239/331, 333, 375, 525, 152, 154, 360; 417/44.2, 15, 18, 38, 44

[56] References Cited

U.S. PATENT DOCUMENTS

| | | | |
|---|---|---|---|
| 3,288,079 | 11/1966 | Kling | 103/153 |
| 3,317,141 | 5/1967 | Mann | 239/332 |
| 3,904,116 | 9/1975 | Jones et al. | 239/332 |
| 4,397,610 | 8/1983 | Krohn | 417/44.2 |
| 4,900,233 | 2/1990 | Ripley | 417/266 |
| 4,925,105 | 5/1990 | Lin | 239/332 |
| 5,092,185 | 3/1992 | Zornes et al. | 74/50 |
| 5,211,611 | 5/1993 | Lammers | 475/178 |
| 5,244,351 | 9/1993 | Arnette | 417/38 |
| 5,248,089 | 9/1993 | Bekins | 239/332 |
| 5,292,232 | 3/1994 | Krohn et al. | 417/44.2 |
| 5,303,847 | 4/1994 | Cottone | 239/332 |
| 5,417,309 | 5/1995 | Brackett | 184/6.5 |

FOREIGN PATENT DOCUMENTS

| | | | |
|---|---|---|---|
| 28 26 045 | 6/1979 | Germany | F04B 9/04 |
| 2044895 | 10/1980 | United Kingdom | G05G 5/18 |

OTHER PUBLICATIONS

Graco Instructions–Parts List 308–548, 390sts Airless Paint Sprayer; 1994 Minneapolis, MN.

Glidden Operational Manual and Parts List for Power Pup 4 & 5; Dec. 1993, Moorpark, CA.

Titan Owners Manual 313–006, Epic 440e; 1994, Oakland, NJ.

*Primary Examiner*—Andreas Kashnikow
*Assistant Examiner*—Lisa Ann Douglas
*Attorney, Agent, or Firm*—Faegre & Benson

[57] ABSTRACT

A yoke support for a reciprocating member in portable paint spraying equipment having a slot in the housing perpendicular to an axis of reciprocation, and an extension on the reciprocating member and a removable support secured to the housing and aligned with the extension of the reciprocating member and carrying a bearing sized to receive the extension in sliding relationship such that the bearing supports the extension of the reciprocating member in alignment with the housing and the removable support allows installation and removal of the reciprocating member by providing clearance for the extension via the slot in the housing when the removable support is removed.

15 Claims, 4 Drawing Sheets

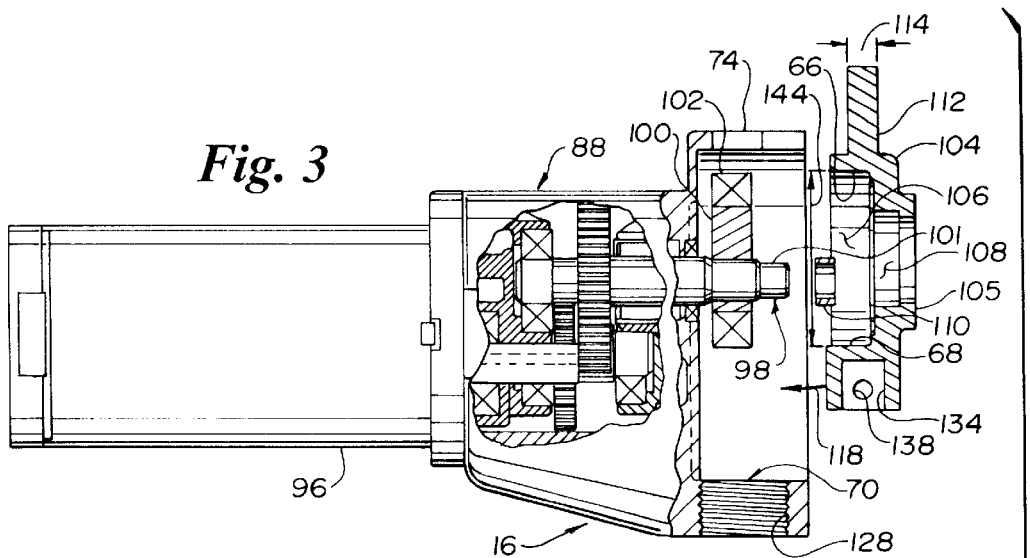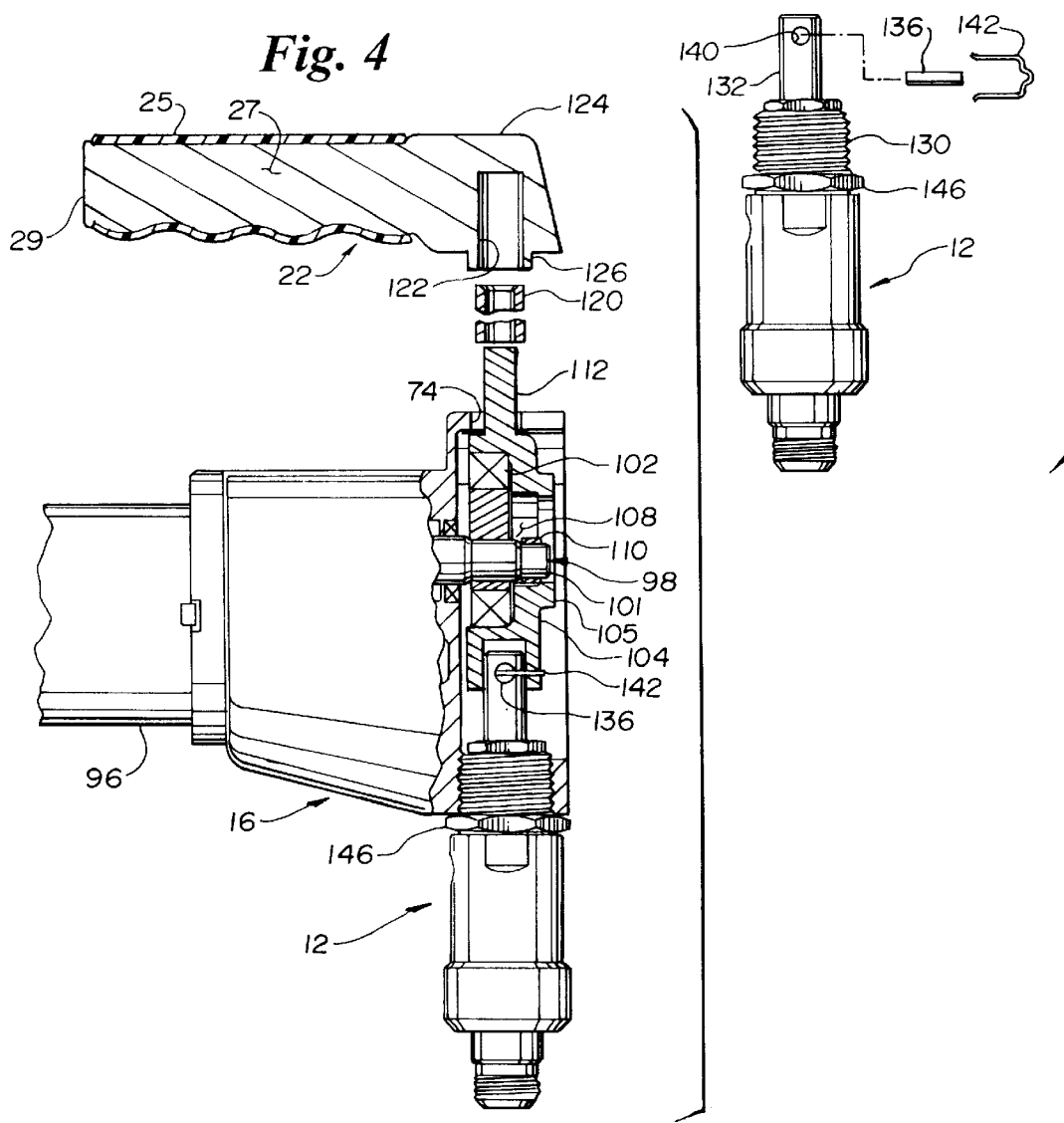

YOKE SUPPORT FOR PISTON PAINT PUMPS

FIELD OF THE INVENTION

This invention relates to the field of portable spray paint pumps, particularly to those pumps utilizing a rotary to reciprocating motion-converting mechanism such as a Scotch yoke.

BACKGROUND OF THE INVENTION

In the past it has been found necessary to have relatively complex assemblies to support rotary to reciprocating motion-converting mechanisms such as are desirable in portable piston paint pumps. Such complex assemblies were difficult and costly to produce and assemble and resulted in time consuming and sometimes difficult service procedures as well. The present invention overcomes such difficulties by providing a simple and inexpensive apparatus and method for installing and removing a Scotch yoke, which, together with a cooperating eccentric, provides a simple and easily serviceable rotary to reciprocating motion-converting mechanism.

BRIEF DESCRIPTION OF THE DRAWINGS

FIG. 3 is an exploded partial side elevational view of the pump of FIG. 1 with parts cut away.

FIG. 4 is a view similar to that of FIG. 3 but with parts partially assembled.

DETAILED DESCRIPTION OF THE INVENTION

Figure 1:
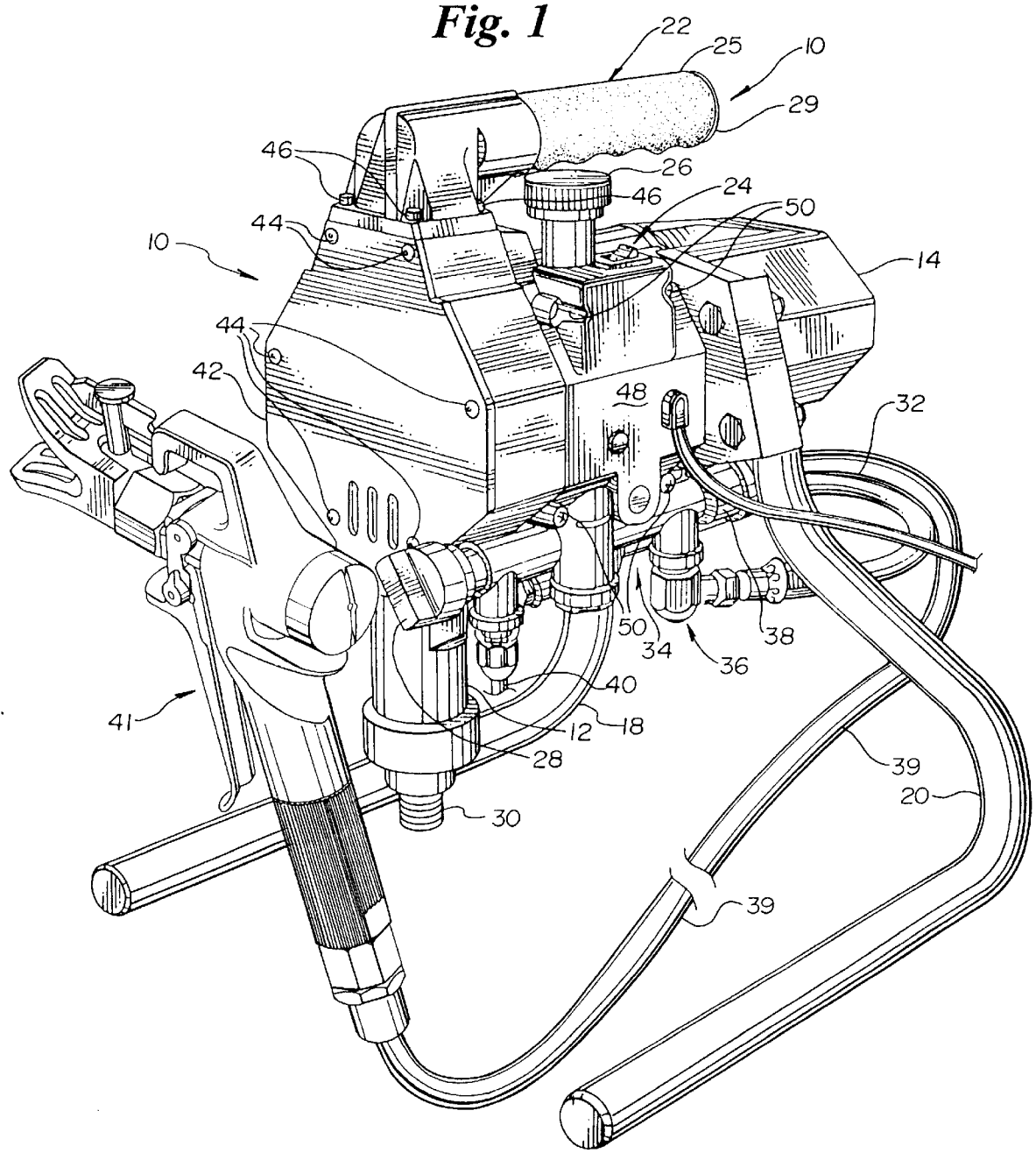
FIG. 1 is a perspective view of a pump assembly useful in the practice of the present invention.

Referring now to the Figures, and most particularly to FIGS. 1 and 3, a perspective view of a pump assembly 10 useful in the practice of the present invention may be seen. Pump assembly 10 includes a fluid section 12 driven by an electric motor 96 enclosed by housing 14. The motor powers a gear box or reducer 88 in housing 16 which also has a rotary to linear motion converting mechanism in the form of a reciprocating or reciprocatable member such as a Scotch yoke 104 contained therein to provide reciprocating linear motion to drive the fluid section 12. Motor 96 and gear reducer 88 together form a prime mover to power the pump 10. Pump 10 preferably has a pair of feet or supports 18, 20 and a handle 22 for portability of the pump 10. Pump 10 further preferably has an on/off switch 24, a pressure setting knob 26, and a priming control 28. In operation, paint is drawn into an inlet 30 of the fluid section, and raised to a high pressure of about 2000–3000 p.s.i. by the fluid section 12, which delivers the pressurized paint via a hose 32 to a fluid manifold 34 via a fluid coupling 36. The fluid manifold 34 has a paint outlet 38 for connection to another fluid hose 39 similar to hose 32 which, in turn, is connected to a hand-held paint spray gun 41 for application of paint to a surface to be coated. Priming control 28 allows paint to be delivered to a bypass 40 during priming and also in the event of an overpressure situation, since the priming control 28 also functions as an over-pressure relief valve for fluid manifold 34.

Housing 16 preferably has a cover 42 secured by a plurality of fasteners 44. Similarly, handle 22 is secured to housing 16 by fasteners 46. A control cover 48 is preferably formed integrally with the fluid manifold 34 and is secured to housing 16 by fasteners received in recesses 50.

Figure 2:
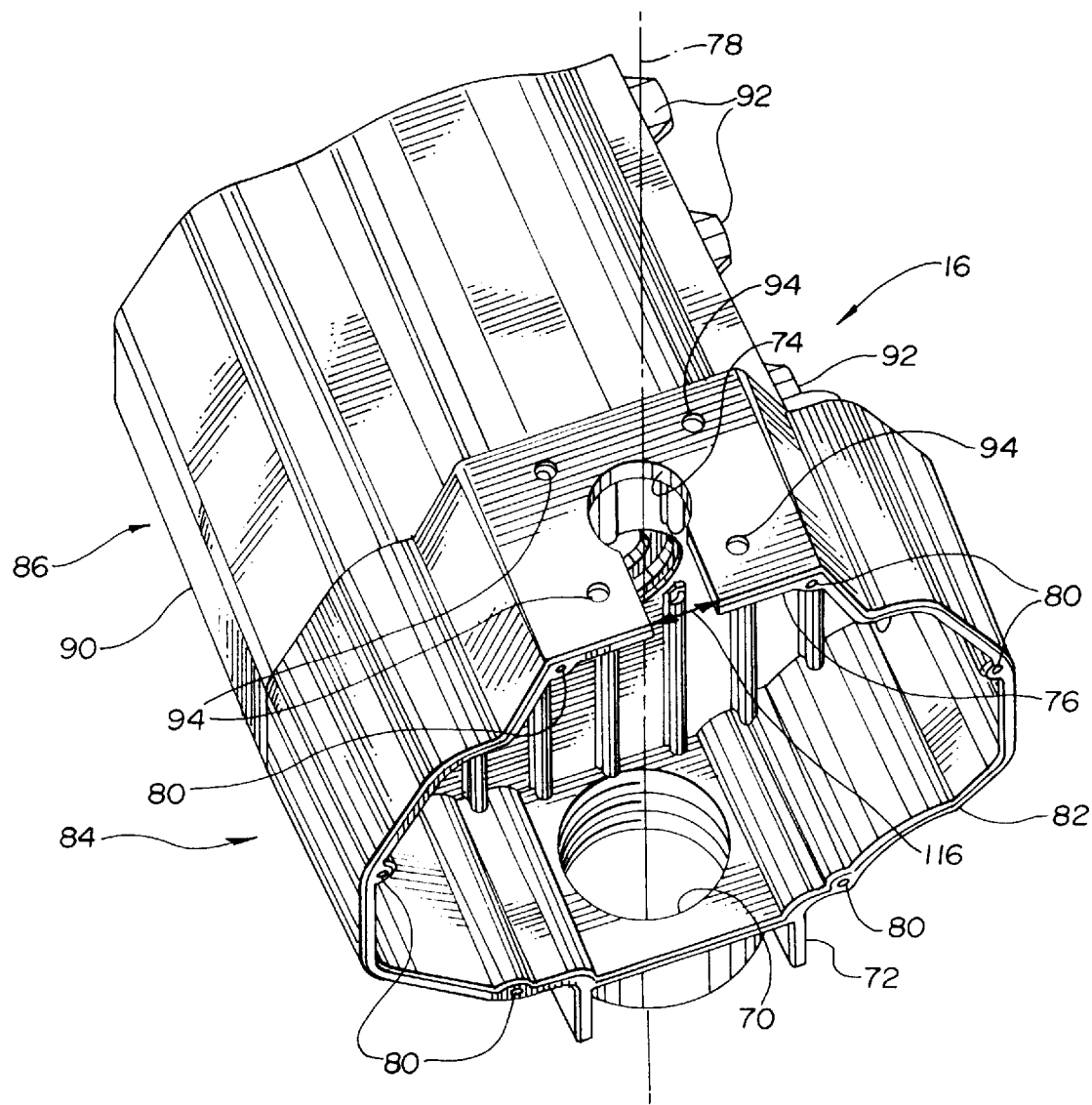
FIG. 2 is a perspective view of a yoke and gear housing useful in the practice of the present invention.

Referring now also to FIG. 2, the perspective view of the gear and yoke housing 16 may be seen. Housing 16 is preferably an aluminum die casting having a threaded bore 70 at a lower portion 72 and a key hole slot 74 at an upper portion 76. It is to be understood that the enlarged portion of key hole slot 74 and the bore 70 are concentric to each other, and each of slot 74 and bore 70 are perpendicular to an axis of reciprocation 78. A plurality of apertures 80 are preferably threaded to receive fasteners 44 to secure cover 42 to a face 82 of a front portion 84 of housing 16. It is to be understood that housing 16 is made up of the front portion 84 to house a Scotch yoke assembly, and a rear portion 86 to house a gear reducer 88 (see FIG. 3). The rear portion 86 of housing 16 has an enclosing wall 90 and a plurality of projections 92, each having a threaded aperture or blind bore therein for receiving fasteners to hold cover 42 to housing 16, when the fasteners are received in recesses 50, it being understood that apertures or recesses 50 are respectively aligned with projections 92 when cover 42 is received on rear portion 86. The upper portion 76 of housing 16 also preferably has a plurality of threaded apertures 94 to receive and retain fasteners 46 to secure the handle 22 to upper portion 76 of housing 16 (see FIGS. 1 and 5).

Figure 5:
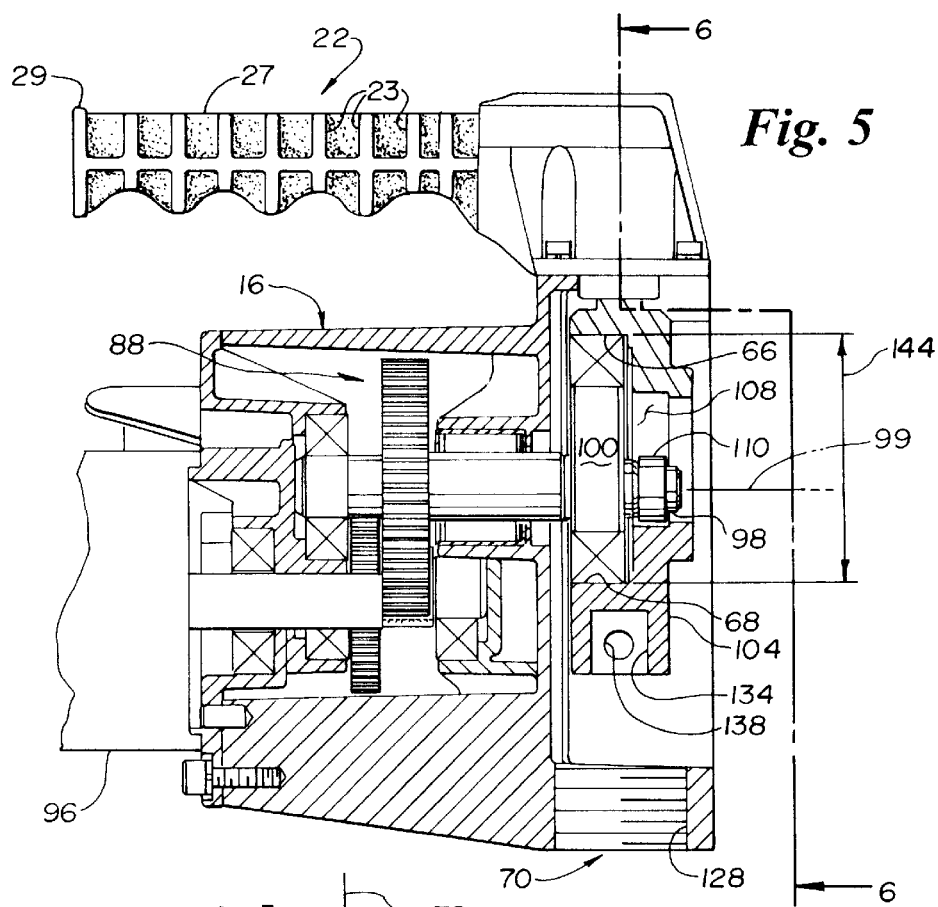
FIG. 5 is a fragmentary side elevation view similar to that of FIG. 3 with parts shown in section along line 5—5 of FIG. 6.
Figure 6:
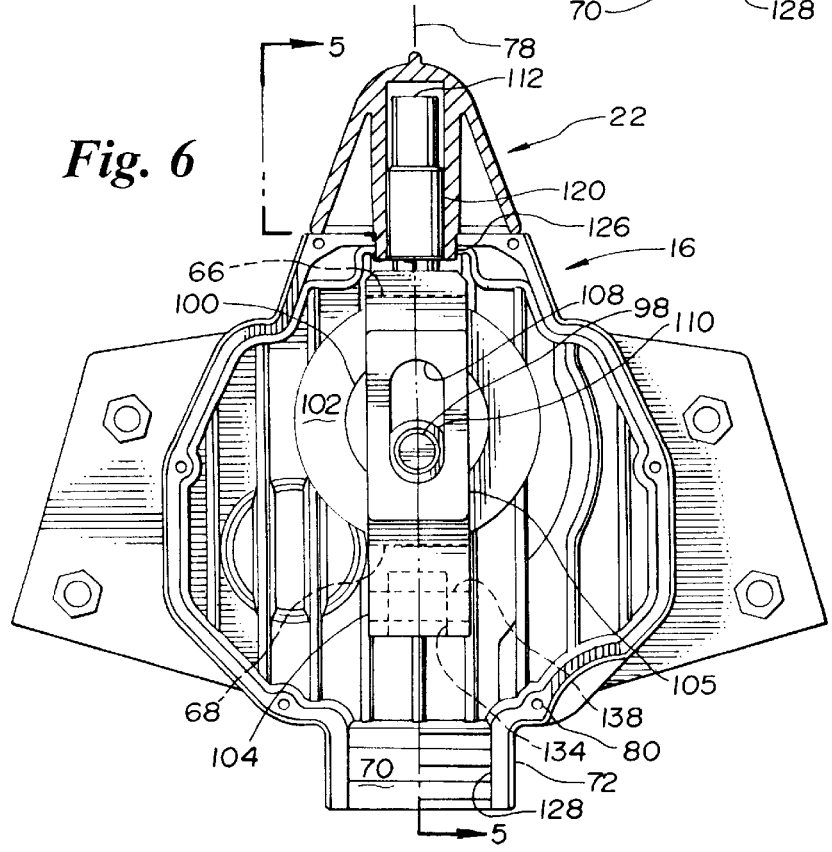
FIG. 6 is a front elevation view of the pump of FIG. 5 with parts shown in section along line 6—6 of FIG. 5.

Referring now most particularly to FIGS. 1, 4 and 5, handle 22 is preferably formed with a plurality of ribs 23 extending radially outwardly from a spine 27. An enlarged end 29 retains a hollow cylindrical cover 25 which, being resilient, conforms to the finger grip profile on the lower portion of spine 27.

Referring now also to FIGS. 3–6, the electric motor 96 rotates an output shaft 98 via the gear reducer 88 about an axis of rotation 99. Output shaft 98 is secured to an eccentric 100 and is preferably keyed thereto. Eccentric 100 is surrounded by an anti-friction bearing 102 (of the ball or roller type) which together form an eccentric assembly which, in turn, is received in a Scotch yoke 104. Yoke 104 is preferably a precision cast nickel-aluminum-bronze part available as alloy No. A0201 from the Piad Precision Casting Corporation, Westmoreland County Industrial Park, R.D. 12, Box 38, Greensburg, Pa. 15601. Yoke 104 has a recess 106 having a diametral dimension 144 sized to fit to the outer race of bearing 102 in a slip or sliding fit. Yoke 104 further has an elongated slot 108 to receive a bushing 110 and an extension 101 of output shaft 98, which may be seen most clearly in FIGS. 5 and 6. Yoke 104 has an extension or pintle 112, extending therefrom. Pintle 112 is preferably cylindrical and has a diameter 114 less than the width 116 of the narrowest portion of slot 74 (see FIG. 2). Yoke 104 has a body portion 105 intermediate the extension 112 and a piston engaging connection 134. The body portion 105 of yoke 104 has a pair of shoe portions 66, 68 which are opposed to or facing each other, and spaced apart the diametral distance 144. Yoke 104 is installed by moving it transversely along the direction indicated by arrow 118 in FIG. 3 until it is in the position shown in FIG. 4. A bushing 120 is preferably pressed into a recess 122 in the yoke support portion 124 of handle 22. Cylindrical projection or shoulder 126 on removable support 124 is preferably sized to closely inter-fit with the circular portion of key hole slot 74 to align the yoke 104 for reciprocation along axis 78. It is to be understood that pintle 112 is guided in a sliding bearing or sleeve bushing 120 which is centered by projection 126 in slot 74, as may be seen most clearly in FIG. 6. As may also be seen in FIG. 6, shoe portions 66 and 68 of yoke 104 engage the eccentric (via the bearing 102) in a region in alignment with the axis of reciprocation 78, such that the prime mover will rotate the eccentric and reciprocate the yoke 104 by driving the shoe portions 66, 68 alternately back and forth along the axis of reciprocation 78.

Bushing 110 riding in the slot 108 provides additional guidance for yoke 104 to maintain alignment along axis 78.

Fluid section 12 is installed in housing 16 by interengaging threads 128 and threads 130 until a piston 132 is received in the recess or piston engaging connection 134 in yoke 104. A transverse pin 136 is then inserted into aligned mating apertures 138, 140 in the yoke 104 and piston 132, respectively. A spring clip 142 is then placed on yoke 104 to retain pin 136 in mating apertures 138, 140, all as shown in FIG. 4. A lock nut 146 on fluid section 12 may be used to secure fluid section 12 to housing 16 in the desired alignment. Once fluid section 12 is thus installed, it is to be understood that piston 132 will be aligned with the axis of reciprocation 78, which is perpendicular to the axis of rotation 99.

The invention is not to be taken as limited to all of the details thereof as modifications and variations thereof may be made without departing from the spirit or scope of the invention. For example, and not by way of limitation, the yoke support may be formed without handle 22, and may still be further modified by the omission of bushing 120, if desired, while still remaining within the spirit and scope of the invention.

What is claimed is:

1. In a portable piston paint pump of the type having a reciprocating member slideably supported in a housing as a part of a rotary to reciprocating motion converting mechanism, the improvement comprising:
   a. a slot in the housing perpendicular to an axis of reciprocation of the reciprocating member;
   b. an extension on the reciprocating member extending through the slot and projecting beyond the housing; and
   c. a removable support secured to the housing and aligned with the extension of the reciprocating member to support the extension of the reciprocating member in alignment with the housing and wherein the removable support allows installation and removal of the reciprocating member by providing clearance for the extension via the slot when the removable support is removed.

2. The improvement of claim 1 wherein the reciprocating member is a Scotch yoke.

3. The improvement of claim 2 wherein the yoke is formed of a nickel-aluminum-bronze alloy.

4. The improvement of claim 1 wherein the removable support further comprises a bearing.

5. The improvement of claim 4 wherein the bearing is a sleeve bushing.

6. The improvement of claim 1 wherein the slot has an enlarged portion and the removable support includes a shoulder received in the enlarged portion of the slot to locate the support with respect to the housing.

7. The improvement of claim 1 wherein the removable support further includes a handle for lifting the portable piston paint pump.

8. A method of installing a reciprocating member in a portable piston paint pump comprising the steps of:
   a. aligning a reciprocating member parallel to and spaced apart from an axis of reciprocation of a housing of the piston paint pump;
   b. moving the reciprocating member perpendicularly to the axis of reciprocation through a slot in a housing of the pump until the reciprocating member engages a rotatable eccentric adapted to reciprocate the reciprocating member;
   c. moving a removable support along the axis of reciprocation towards the reciprocating member projecting through the slot until the support engages the reciprocating member and contacts the housing; and
   d. securing the removable support to the housing to maintain the reciprocating member in alignment with the axis of reciprocation by engaging a shoulder on the support with a mating recess in the housing to maintain the reciprocating member in alignment with the axis of reciprocation.

9. The method of claim 8 further comprising the additional steps of:
   e. engaging a piston with a portion of the reciprocating member distal of the removable support by moving a fluid section carrying the piston along the axis of reciprocation towards the reciprocating m ember; and
   f. engaging the fluid section with the housing to maintain the fluid section in alignment with the axis of reciprocation.

10. The method of claim 8 wherein the removable support includes a bushing and wherein step c. further comprises engaging the bushing with the reciprocating member.

11. The method of claim 8 wherein step d. still further comprises installing and tightening at least one threaded fastener projecting through the support and threadably received in the housing to secure the support to the housing.

12. An improved assembly for a Scotch yoke reciprocating mechanism in a portable piston paint pump comprising:
   a. a prime mover having an output shaft selectively rotatable about an axis of rotation;
   b. an eccentric assembly carried on the output shaft and having a shaft extension projecting in alignment with the axis of rotation of the output shaft;
   c. a Scotch yoke type reciprocatable member located along an axis of reciprocation perpendicular to the axis of rotation and having
      i. an extension at one end thereof aligned with the axis of reciprocation,
      ii. a piston-engaging connection at the other end thereof, and
      iii. a body portion mediate the extension and piston-engaging connection and carrying a slot through which the shaft extension projects, the body portion having a pair of opposed shoe portions, each of which engages a region of the eccentric assembly in alignment with the axis of reciprocation such that the prime mover rotates the eccentric assembly and reciprocates the reciprocatable member by driving the shoe portions alternately back and forth along the axis of reciprocation;
   d. a housing having a slot perpendicular to the axis of reciprocation and receiving the extension; and
   e. a removable support secured to the housing and aligned with and in sliding contact with the extension of the reciprocatable member to permit reciprocating movement thereof while holding the reciprocatable member in alignment with the axis of reciprocation.

13. The improved assembly of claim 12 wherein the slot further comprises an enlarged cylindrical recess concentric to the axis of reciprocation and wherein the removable support further comprises a cylindrical projection congruent to and received in the cylindrical recess to positively locate the removable support with respect to the axis of reciprocation.

14. The improved assembly of claim 12 wherein the eccentric assembly further comprises an eccentric member surrounded by an anti-friction bearing engaging the shoe portions of the body of the yoke.

15. An improved portable spray painting apparatus comprising
   a. a fluid section forming a piston paint pump for pressurizing paint;
   b. a paint spray gun connected to the pump for atomizing paint to be applied to a surface;
   c. a prime mover including a motor and gear reducer having an output shaft carrying an eccentric surrounded by an antifriction bearing, the output shaft having a shaft extension rotating about an axis of rotation;
   d. a Scotch yoke reciprocatable member located along an axis of reciprocation perpendicular to the axis of rotation and having
      i. an extension at one end thereof aligned with the axis of reciprocation,
      ii. a piston-engaging connection at the other end thereof, and
      iii. a body portion mediate the extension and piston-engaging connection and carrying a slot through which the shaft extension projects, the body portion having a pair of opposed shoe portions, each of which engages a region of the antifriction bearing surrounding the eccentric in alignment with the axis of reciprocation such that the prime mover rotates the eccentric and reciprocates the reciprocatable member by driving the shoe portions alternately back and forth along the axis of reciprocation;
   d. a housing having a slot perpendicular to the axis of reciprocation and receiving the extension; and
   e. a removable support secured to the housing and aligned with and in sliding contact with the extension of the reciprocatable member to permit reciprocating movement thereof while holding the reciprocatable member in alignment with the axis of reciprocation.

\* \* \* \* \*